Oct. 31, 1939.　　　　W. K. YOUNG　　　　2,178,384
BORING TOOL
Filed June 15, 1936
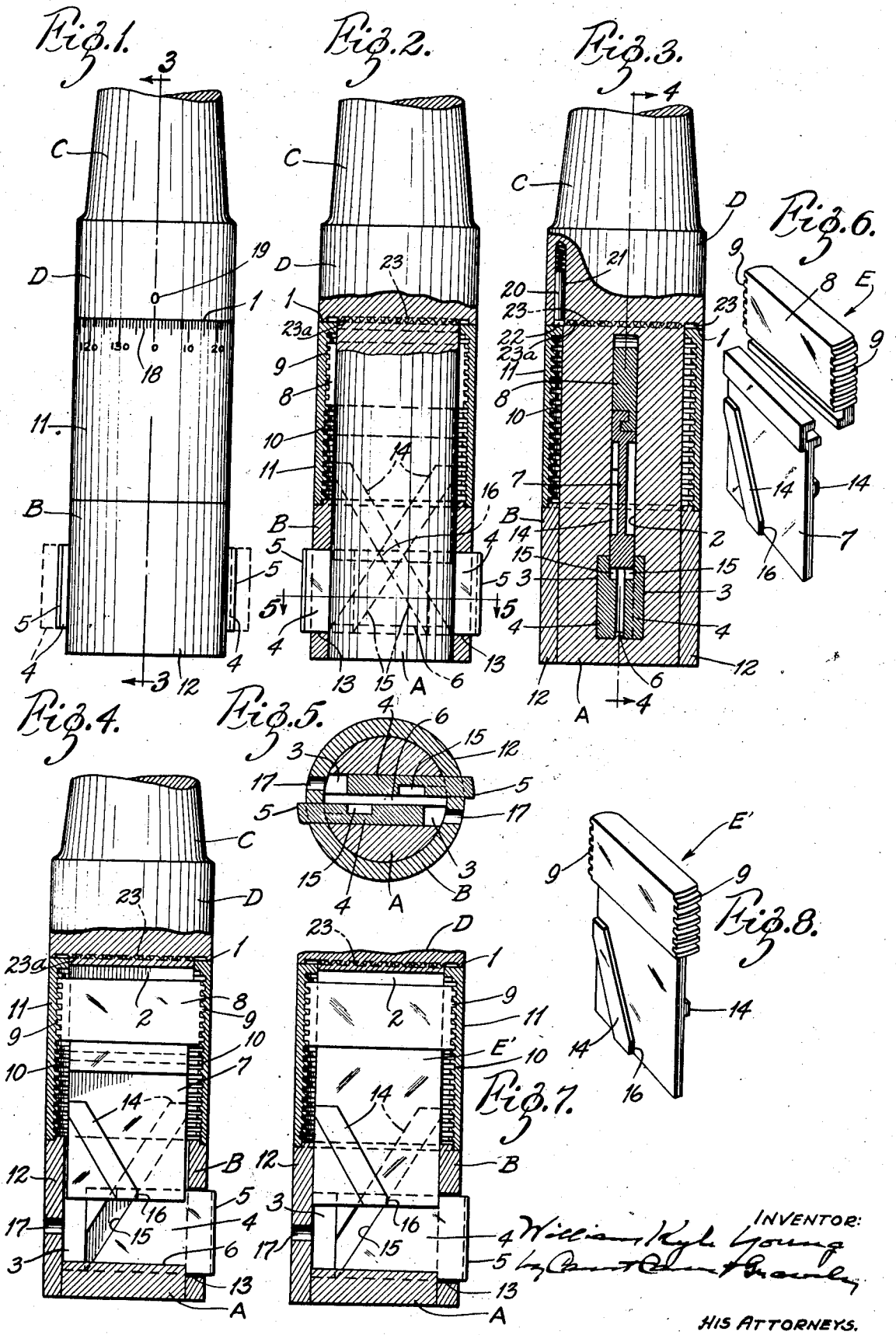
INVENTOR:
William Kyle Young
HIS ATTORNEYS.

Patented Oct. 31, 1939

2,178,384

UNITED STATES PATENT OFFICE 2,178,384

BORING TOOL

William Kyle Young, Rockford, Ill.

Application June 15, 1936, Serial No. 85,235

5 Claims. (Cl. 77—58)

This invention relates to boring tools or bars of the type shown in my copending application Serial No. 705,307 filed January 5, 1934, now Patent No. 2,090,718, wherein the cutters are adjusted transversely of the tool by means of a longitudinal slide plate having oblique rib-and-groove connections with said cutters. The invention has for its principal objects to enable the cutters to automatically center themselves in a hole whose axis is offset with respect to the tool axis; to provide for the ready insertion and removal of the cutters and the easy entry of the ribs on the cutter operating plate into the grooves in said cutters; to provide for supporting the cutters in all positions of their adjustment; to provide for cutting beyond the end of the boring bar; and to provide for simplicity and cheapness of construction and compactness of design. The invention consists in the boring tool and in the combinations and arrangements of parts hereinafter described and claimed.

In the accompanying drawing, which forms part of this specification and wherein like symbols refer to like parts wherever they occur;

Fig. 1 is a side elevation of a boring tool embodying my invention;

Fig. 2 is a view similar to Fig. 1 with the sectional casing of the tool shown in section;

Fig. 3 is a central longitudinal section on the line 3—3 in Fig. 1;

Fig. 4 is a vertical central longitudinal section on the line 4—4 in Fig. 3;

Fig. 5 is a cross-section on the line 5—5 in Fig. 2;

Fig. 6 is a perspective view of the two-piece cutter actuating plate;

Fig. 7 is a view similar to Fig. 4, showing a tool provided with a one-piece cutter operating plate;

Fig. 8 is a perspective view of the cutter operating plate shown in Fig. 7.

The boring tool shown in Figs. 1 to 6, inclusive, of the accompanying drawing, comprises a bar having a cylindrical outer end portion A provided with a sectional casing B, a suitable shank or inner end portion C, adapted for cooperation with a suitable machine tool (not shown), and an intermediate portion or collar D that forms an annular abutment 1 for the inner end of said casing. The cylindrical outer end portion A is provided with an elongated diametral slot 2 that terminates short of the ends thereof and is widened at the outer end to form opposed recesses 3 adapted to support a pair of cutters 4 for sliding movement transversely of the tool axis. The cutters 4 are of rectangular shape, project on opposite sides of the tool and are provided at their outer ends with suitable cutting edges 5. At the outer end of the elongated slot 2 the tool is provided with a diametral rib 6 that is disposed parallel with and extends between the opposing faces of the two cutters.

The cutters 4 are projected from and drawn into their supporting recesses or slideways 3 by means of a sectional operating plate E mounted in the elongated diametral slot 2 for sliding movement lengthwise thereof. The outer section 7 of this cutter operating plate is of less width than the diameter of the outer end portion A of the tool; and the inner section 8 of said plate is of greater width than said diameter and is provided along its longitudinal side edges with square screw threads 9 that cooperate with similar internal threads 10 in the inner section 11 of the sectional casing B that surrounds said cylindrical outer end portion and is rotatable thereon. The outer casing section 12 is press-fitted on or otherwise nonrotatably secured to the cylindrical portion A of the tool and cooperates with the shoulder 1 at the inner end of said portion to prevent endwise movement of the rotatable inner casing section or sleeve 11 thereon. The fixed outer casing section 12 is provided with openings 13 adapted to slidably support the outer end portion of the cutters.

The threaded section 8 of the operating plate E has a tongue-and-groove connection along its outer edge with the inner edge of the outer plate section 7; and said outer section is adapted to extend between the two cutters and is provided with two reversely inclined oblique ribs 14, arranged one on each side face of said plate. The cutters 4 are provided on their opposing sides with oblique grooves 15 that slidably receive the oblique ribs 14 on the respective side faces of the outer operating plate section 7. With this arrangement, when the inner casing section or adjusting sleeve 11 is rotated in one direction, the operating plate E is slid longitudinally in the slot 2 toward the outer end of the slot 2 and the cutters 4 are projected outwardly; and when said section is rotated in the opposite direction, the operating plate is drawn inwardly and the cutters are retracted.

As shown in Figs. 2, 4 and 6, the outer ends of the ribs 14 on the outer section 7 of the blade actuating plate E are coped off or beveled, as at 16, so as to permit easy entrance thereof into the inner ends of the grooves 15 in the cutters when the plate is slid outwardly to engage the same. The fixed outer section 12 of the tool casing B is provided opposite the ends of the cutters 4 that are remote from the cutting edges 5 thereof with openings 17 through which a suitable tool may be inserted to push the cutters from the tool, when they become worn and do not project beyond the casing in their retracted positions.

The inner end of the rotary cutter adjusting section 11 of the casing B is provided with a series of circumferentially spaced graduations 18 adapted to cooperate with an index mark 19 for indicating the diameter of the hole for which the cutters of the tool are adjusted. This rotary cutter operating sleeve is held in the desired position of its rotary adjustment by means of a plunger 20 that is slidably mounted in a bore 21 that extends longitudinally of the boring bar through the annular sleeve shoulder 1 thereon. This plunger has a beveled outer end portion 22 that is yieldably held in engagement with any one of the spaces between a series of circumferentially spaced V-shaped teeth 23 formed in a reduced inner end portion of the rotary sleeve, which portion fits within an annular groove 23a provided therefor in the annular shoulder or abutment 1. The spacing of the teeth in the graduated end of said sleeve corresponds to the spacing of the graduations thereon. With this arrangement, the rotary cutter adjusting casing section or sleeve is held against accidental rotation by spring-pressed plunger 20, but may be readily rotated by using enough force to overcome the pressure of said plunger thereon.

By the arrangement described, the cutters may be quickly and easily adjusted for bores of different diameters by turning the rotary section 11 of the hardened steel casing B. This casing protects the tool from damage; it also prevents chips and other foreign matter from entering the elongated slot 2 for the plate and the cutters actuated thereby; and it also serves to support the outer ends of the cutters and strengthens and reinforces the slotted portion of the tool. By forming the cutter operating plate E in two sections, the outer section of said plate, together with the cutters interlocked therewith, are adapted to slide or float crosswise of the tool and thus permit the cutters to center themselves in bores that are offset slightly with respect to the boring tool. When the cutter operating plate is drawn inwardly clear of the cutters, said cutters may be removed without disturbing said plate and without removing the casing. The beveling of the outer or entering ends 16 of the oblique ribs 14 on said cutter operating plate serves to pilot said ends into the grooves at the beginning of their engagement without requiring the cooperating ends of said ribs and grooves to be in exact register.

The diametral rib 6 at the outer end of the elongated slot serves to prevent side play of the cutters in cross slides 3; and such side play is further prevented by means of the operating plate, which enters the space between said cutters before it starts to move them outwardly and continues to advance through such space until the blades reach their fully projected positions when said plate abuts against said diametrial rib and cooperates with said rib to completely fill the space between said cutters. The holes 17 located in the casing opposite the ends of the cutters remote from the cutting edges thereof permit short or worn cutters to be driven out of their slideways by inserting a suitable tool in said holes. The cutters may be accurately adjusted by means of the graduated rotary sleeve section of the casing; and the teeth of said sleeve and the spring-pressed plunger cooperating therewith are concealed within the body of the tool where dust or dirt cannot reach them and where they cannot be damaged.

In the modified construction shown in Figs. 7 and 8, the cutter adjusting plate E' is made in one piece, instead of being made in sections, as shown in Figs. 1 to 6, inclusive. This one piece cutter actuating plate is intended for use with work wherein the axis of the tool lines up accurately with the axis of the hole that is to be finish reamed or bored.

Obviously, the hereinbefore boring tool admits of considerable modification without departing from the invention. Therefore, I do not wish to be limited to the precise construction shown and described. For instance, the angularity of the cooperating ribs and grooves of the operating plate and cutters may be varied, the ribs may be on the cutters rather than on the operating plate, and the ends of the grooves may be flared instead of tapering the ends of the ribs to facilitate the initial engagement thereof.

What I claim is:

1. A boring tool comprising a body portion provided with a longitudinal slot, a plate mounted in said slot for sliding movement longitudinally of said body portion, a cutter mounted in said slot alongside of said plate for sliding movement transversely of said body portion, and means on said body portion for actuating said plate in said slot, said plate comprising a section operatively connected to said plate actuating means and a section operatively connected to said cutter to actuate the same and having a connection with said first mentioned section permitting free floating movement of said second mentioned section in the direction of the sliding movement of said cutter.

2. A boring tool comprising a body portion, a plate mounted in said body portion for sliding movement longitudinally thereof, cutters mounted in said body portion for sliding movement transversely thereof on opposite sides of said plate, and means on said body portion for actuating said plate in said slot, said plate comprising a section operatively connected to said plate actuating means and a second section having oblique rib-and-groove connections with said cutters, said second section having a rib-and-groove connection with said first mentioned section that prevents relative movement of said sections lengthwise of said body portion while permitting free floating movement of said second section and the cutters cooperating therewith transversely of said body portion.

3. A boring tool comprising a cylindrical body portion provided with an elongated diametral slot, a plate slidable in said slot longitudinally of said body portion, cutters mounted in said slot on opposite sides of said plate for sliding movement transversely of said body portion, and means on said body portion for actuating said plate in said slot, said means including a casing surrounding the slotted body portion of said tool and having openings therein through which said cutters slide, said plate comprising an inner end section operatively connected to said plate actuating means and an outer end section having connections with said cutters for actuating the same when said outer end section is moved longitudinally of said slot, said outer end section being of less width than the inside diameter of said casing and being connected to said inner end section for free movement relative thereto with said cutters transversely of said casing.

4. A boring tool comprising a cylindrical body portion provided with an elongated diametral slot, a plate slidable in said slot longitudinally of said body portion, cutters mounted in said slot on opposite sides of said plate for sliding movement transversely of said body portion, and means on said body portion for actuating said plate in said slot, said means including a casing surrounding the slotted body portion of said tool and having openings therein through which said cutters operate, said plate comprising an inner end section operatively connected to said plate actuating means and an outer end section having oblique rib-and-groove connections with said cutters for actuating the same when said outer end section is moved longitudinally of said slot, said outer end section being of less width than the inside diameter of said casing and having a rib-and-groove connection with said inner end section preventing relative movement of said sections longitudinally of said slot while permitting limited free floating movement of said outer end section transversely of said casing.

5. A boring tool comprising a cylindrical body portion having a reduced portion forming a shoulder and provided with an elongated diametral slot, a plate mounted in said slot for sliding movement longitudinally thereof, a cutter mounted in said slot alongside of said plate for movement transversely of said body portion, a connection between said plate and said cutter for actuating said cutter when said plate is moved longitudinally of said slot, and a sectional cylindrical casing surrounding said reduced portion and provided with an opening adapted to snugly receive said cutter, said casing covering said slot, the plate therein and the end of said cutter remote from the cutting edge thereof and being provided opposite said remote end with a relatively small opening adapted to receive a tool for pushing said cutter through the opening in said casing, said casing comprising an outer end section rigidly fixed to said reduced portion and having the cutter and tool receiving openings formed therein and a rotatable inner end section operatively connected to said plate for actuating the latter and held against endwise movement on said reduced portion between the shoulder formed thereby and the outer end section fixed thereon.

WILLIAM KYLE YOUNG.